(12) United States Patent
Giassa et al.

(10) Patent No.: US 11,388,228 B2
(45) Date of Patent: Jul. 12, 2022

(54) METHODS, SYSTEMS AND COMPUTER READABLE MEDIA FOR SELF-REPLICATING CLUSTER APPLIANCES

(71) Applicant: Keysight Technologies, Inc., Santa Rosa, CA (US)

(72) Inventors: Matthew Ronald John Giassa, Delta (CA); Alexandru Badea, Calabasas, CA (US); Nicolae Sorin Fetche, Newbury Park, CA (US); Serif Narcis Abdulamit, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 115 days.

(21) Appl. No.: 16/671,005

(22) Filed: Oct. 31, 2019

(65) Prior Publication Data

US 2021/0136147 A1 May 6, 2021

(51) Int. Cl.
*H04L 29/08* (2006.01)
*H04L 12/28* (2006.01)
*H04L 67/104* (2022.01)

(52) U.S. Cl.
CPC ...... *H04L 67/1051* (2013.01); *H04L 12/2814* (2013.01); *H04L 12/2818* (2013.01)

(58) Field of Classification Search
CPC .............. H04L 67/1051; H04L 67/1053
See application file for complete search history.

(56) References Cited

U.S. PATENT DOCUMENTS

| | | |
|---|---|---|
| 7,356,679 B1 | 4/2008 | Le et al. |
| 7,890,723 B2 | 2/2011 | LaPedis et al. |
| 8,387,048 B1 | 2/2013 | Grechishkin et al. |
| 8,706,879 B2 | 4/2014 | Sparks |
| 10,324,747 B1 | 6/2019 | Chakraborty et al. |
| 2014/0149983 A1 | 5/2014 | Bonilla et al. |
| 2014/0281304 A1 | 9/2014 | Hoffman |
| 2015/0156203 A1 | 6/2015 | Giura et al. |
| 2016/0203016 A1 | 7/2016 | Cornea et al. |

(Continued)

OTHER PUBLICATIONS

"Auto-Scalable Network Visibility System," The IP.com Journal, vol. 19, No. 9B, pp. 1-11 (Sep. 2019).

(Continued)

*Primary Examiner* — Nicholas P Celani

(57) ABSTRACT

The subject matter described herein includes methods, systems, and computer readable media for self-replicating cluster appliances. A method for self-replicating cluster appliances includes at a controller node configured for controlling a cluster of one or more network testing and/or visibility nodes: receiving node information associated with a first computing node, wherein the first computing node includes a preconfigured operating system; determining, using the node information, operating system data for configuring the first computing node to be in the cluster; and providing, via a communications interface, the operating system data to the first computing node. The method also includes at the first computing node: receiving the operating system data; and using the operating system data to configure the first computing node to be in the cluster and to provide at least one network testing or visibility service.

20 Claims, 6 Drawing Sheets

(56) References Cited

U.S. PATENT DOCUMENTS

| | | | |
|---|---|---|---|
| 2018/0089206 A1* | 3/2018 | Tamura | G06F 8/656 |
| 2019/0042320 A1* | 2/2019 | Prince | G06F 8/71 |
| 2019/0149410 A1 | 5/2019 | Araujo et al. | |
| 2019/0155613 A1* | 5/2019 | Olderdissen | G06F 21/53 |

OTHER PUBLICATIONS

"Self-Healing Network Visibility System," The IP.com Journal, vol. 19, No. 7A, pp. 1-5 (Jul. 2019).

"What is Docker?," Red Hat Inc., https://opensource.com/resources/what-docker, pp. 1-5 (2019).

"Modernize your applications, accelerate innovation," Enterprise Container Platform: Docker, https://www.docker.com/, pp. 1-5 (2019).

"Concepts: What is Kubernetes," Kubernetes, https://kubernetes.io/docs/concepts/overview/what-is-kubernetes/, pp. 1-7 (Oct. 9, 2019).

"Production-Grade Container Orchestration," Kubernetes, https://kubernetes.io/, pp. 1-8 (2019).

"LaTex—A document preparation system," The LaTex Project, https://www.latex-project.org, pp. 1-2 (Oct. 15, 2019).

"Concepts: Taints and Tolerations," Kubernetes, https://kubernetes.io/docs/concepts/configuration/taint-and-toleration/, pp. 1-11 (Sep. 27, 2019).

"Git VCS," Software Freedom Conservancy, https://git-scm.com, pp. 1-3 (Aug. 16, 2019).

"Tutorials: Viewing Pods and Nodes," Kubernetes, https://kubernetes.io/docs/tutorials/kubernetes-basics/explore/explore-intro/, pp. 1-3 (Apr. 25, 2019).

Kvapil, "Building a Network Bootable Server Farm for Kubernetes with LTSP," Kubernetes, https://kubernetes.io/blog/2018/10/02/building-a-network-bootable-server-farm-for-kubernetes-with-ltsp/, pp. 1-10 (Oct. 2, 2018).

Notice of Allowance and Fee(s) Due for U.S. Appl. No. 14/598,188 (dated Jun. 14, 2018).

Applicant-Initiated Interview Summary for U.S. Appl. No. 14/598,188 (dated May 22, 2018).

Advisory Action for U.S. Appl. No. 14/598,188 (dated Apr. 10, 2018).

Final Office Action for U.S. Appl. No. 14/598,188 (dated Jan. 2, 2018).

Non-Final Office Action for U.S. Appl. No. 14/598,188 (dated Jun. 22, 2017).

Final Office Action for U.S. Appl. No. 14/598,188 (dated Jan. 9, 2017).

Non-Final Office Action for U.S. Appl. No. 14/598,188 (dated Jul. 8, 2016).

"IX Chariot—Solution Brief," Ixia, 915-3034-01 Rev. D, pp. 1-2, www.ixiacom.com (Feb. 2014).

"IxVM," Ixia, web.archive.org/web/20130902225026/http://www.ixiacom.com/products/network_test/applications/ixvm/?print=1 (Sep. 2, 2013).

"GNU General Public License," Free Software Foundation, vol. 2, https://www.gnu.org/licenses/old-licenses/gpl-2.0.en.html, pp. 1-6 (Jun. 1991).

Search Report under Section 17(5) for Great Britain Application Serial No. GB2015752.5 (dated Apr. 13, 2021).

"What are microservices?" Red Hat Inc., Wayback Machine, https://opensource.com/resources/what-are-microservices, pp. 1-7 (Accessed Aug. 11, 2019).

"Principles of Chaos Engineering," https://principlesofchaos.org/?lang=ENcontent, pp. 1-3 (May 2018).

\* cited by examiner

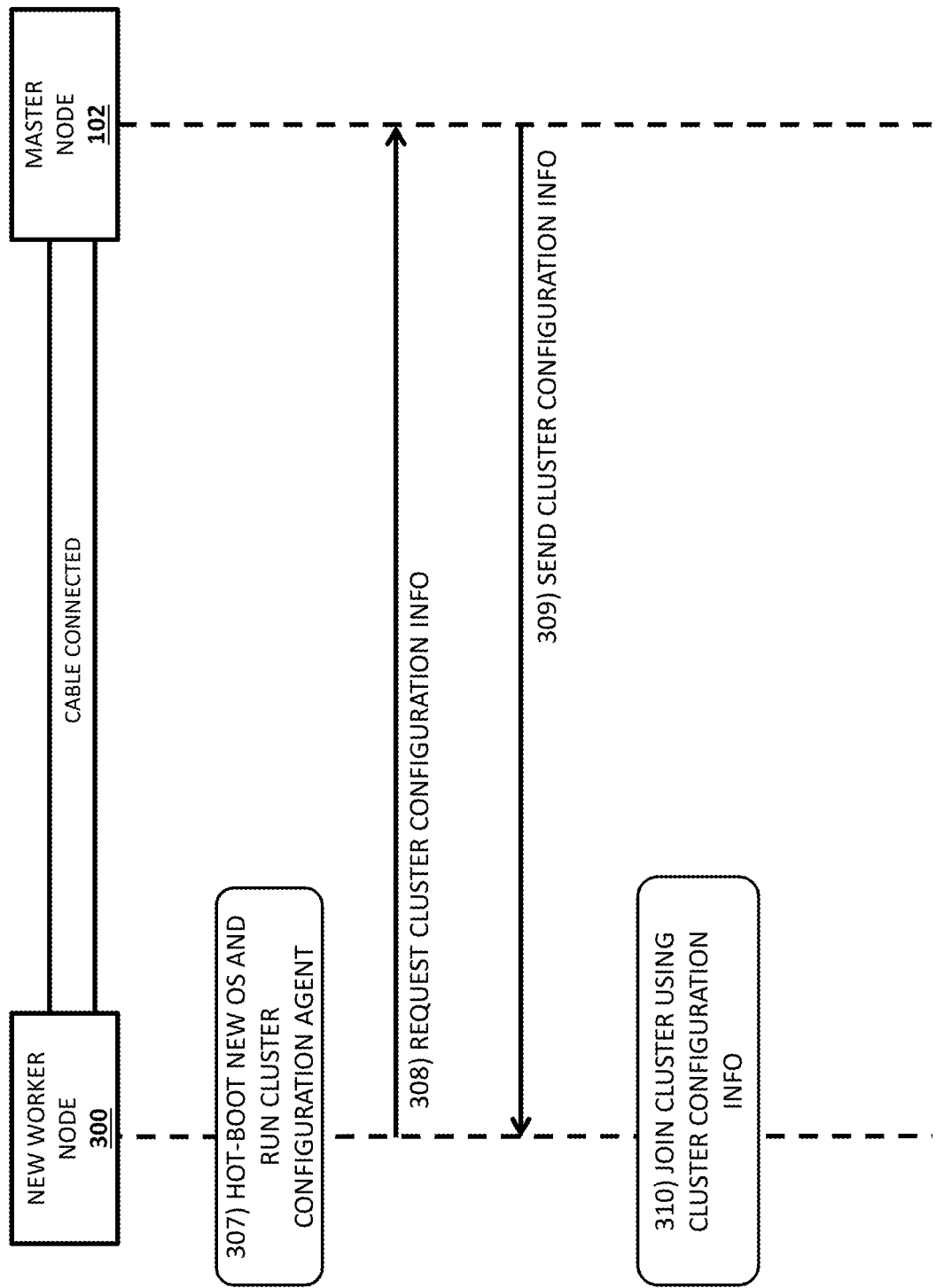

400

| PARTITION ID | DESCRIPTION | READ/WRITE PERMISSIONS |
|---|---|---|
| 0 | FACTORY RESTORE | READ-ONLY |
| 1 | BASE OPERATING SYSTEM (OS) | READ-ONLY |
| 2 | USER DATA | READ AND WRITE |

FIG. 4

METHODS, SYSTEMS AND COMPUTER READABLE MEDIA FOR SELF-REPLICATING CLUSTER APPLIANCES

TECHNICAL FIELD

The subject matter described herein relates to distributed computing environments. More particularly, the subject matter described herein relates to methods, systems, and computer readable media for self-replicating cluster appliances.

BACKGROUND

Containers, also referred to as virtual containers, application containers, or software containers, are units of software that packages or contains code, configurations, and code dependencies. Containers may share an operating system (OS) installed on a physical or virtual machine but each container may run resource-isolated processes. A popular type of containers are Docker containers.

Container or cluster orchestration software, such as Kubernetes, can be used to send containers out to different nodes (e.g., a machine or computing platform for running one or more containers), manage clusters (e.g., one or more nodes, usually a master node and one or more worker nodes) and/or pods (e.g., one or mode containers that can share workload, a local network, and resources), and start up additional containers as demand increases. For example, Kubernetes can be used to configure a Kubernetes service that defines a logical set of pods running somewhere in a cluster (e.g., across multiple nodes), and that all provide the same functionality. In this example, the Kubernetes service may be assigned a unique IP address (also referred to as a clusterIP). This IP address may be tied to the lifespan of the Kubernetes service, e.g., the IP address may not change while the Kubernetes service is alive. Pods can be configured to talk to a Kubernetes service front-end, and communication to the Kubernetes service can be automatically load-balanced by the service front-end to a pod member of the Kubernetes service.

While containers and related orchestration software can be useful for providing cluster related applications or microservices, issues can arise when setting up nodes to act as cluster appliances.

SUMMARY

The subject matter described herein includes methods, systems, and computer readable media for self-replicating cluster appliances. A method for self-replicating cluster appliances includes at a controller node configured for controlling a cluster of one or more network testing and/or visibility nodes: receiving node information associated with a first computing node, wherein the first computing node includes a preconfigured operating system (OS); determining, using the node information, OS data for configuring the first computing node to be in the cluster; and providing, via a communications interface, the OS data to the first computing node. The method also includes at the first computing node: receiving the OS data; and using the OS data to configure the first computing node to be in the cluster and to provide at least one network testing or visibility service.

A system for self-replicating cluster appliances includes at least one processor, a memory and a controller node implemented using the at least one processor and the memory. The controller node is configured for controlling a cluster of one or more network testing and/or visibility nodes. The controller node is further configured for: receiving node information associated with a first computing node, wherein the first computing node includes a preconfigured OS; determining, using the node information, OS data for configuring the first computing node to be in the cluster; and providing, via a communications interface, the OS data to the first computing node. The first computing node is further configured for: receiving the OS data; and using the OS data to configure the first computing node to be in the cluster and to provide at least one network testing or visibility service.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIGS. 3A and 3B depict a message flow diagram illustrating a worker node joining a cluster;

FIG. 4 is a diagram illustrating a memory partition schema associated with a reboot-less or hot-boot based architecture.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
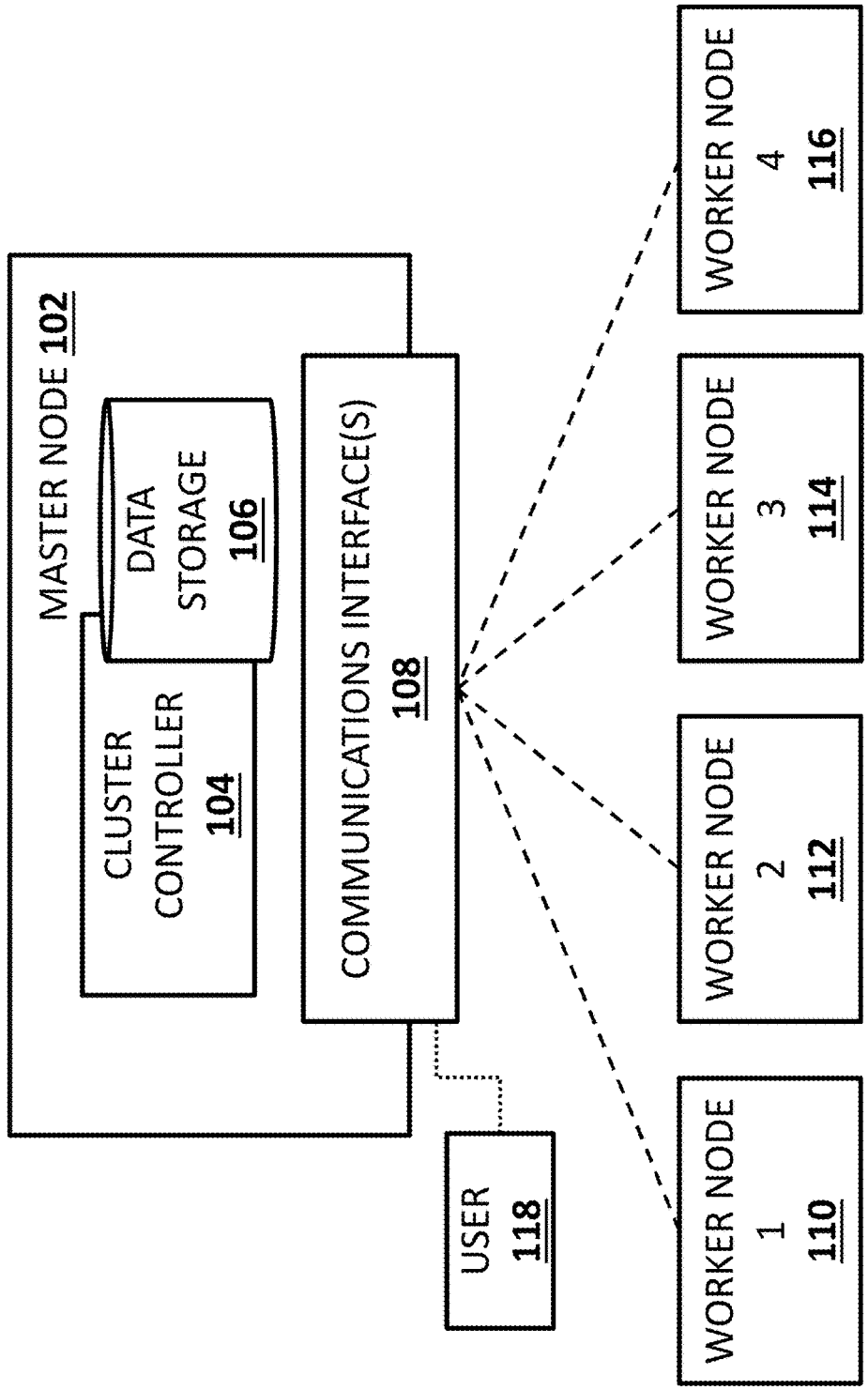
FIG. 1 is a block diagram illustrating an example cluster containing nodes for performing network testing and/or visibility related services.

FIG. 1 is a block diagram illustrating an example cluster 100 containing nodes for performing network testing and/or visibility related services. Referring to FIG. 1, cluster 100 may include a master node 102, worker nodes 110-116, and a user 118.

Master node 102 may represent any suitable entity (e.g., one or more computing platforms or a device implemented using at least one processor) for performing various aspects associated with controlling cluster 100 and for configuring one or more worker nodes 110-116, e.g., network testing and/or visibility nodes. Master node 102 may include cluster controller 104, data storage 106, and one or more communications interface(s) 108.

Cluster controller 104 may represent any suitable entity or entities (e.g., software executing on at least one processor) for controlling cluster 100 and/or various nodes therein. In some embodiments, cluster controller 104 may also include functionality for detecting a new worker node, authorizing the new worker node, and providing a configuration or boot image and/or other data to the new worker node such that the new worker node can join cluster 100. For example, cluster controller 104 may utilize node information received from a new worker node during an authentication process to select an appropriate OS for the new worker node. In this example, after the new worker node has received the appropriate OS, the new worker node may execute software, such as a cluster configuration agent, to receive additional cluster configuration information and complete joining cluster 100.

In some embodiments, cluster controller 104 may utilize container or cluster orchestration software, such as Kubernetes, for providing containers (e.g., containerized applications) to one or more of worker nodes 110-116 and/or for configuring pods (e.g., groups of related containers with similar or same functionality) and services (e.g., microservices) that utilize the containers and pods.

Data storage 106 may represent any suitable entity (e.g., a computer readable medium, a database, a storage device, or memory) for storing configuration or boot images (e.g., operating system (OS) or kernel images), containers (e.g., containerized applications, various software and/or applications, cluster configuration information, authentication information, active services, pod related information, cluster related resource utilization information, and/or other data. For example, data storage 106 may store one or more repository containing different OS images or related software (e.g., various versions of a client-side cluster configuration agent to install on worker nodes 110-116).

Communications interface(s) 108 may represent any suitable entities (e.g., network interface cards (NICs), port modules, and/or other hardware or software) for receiving and sending communications via various communications protocols and/or data formats. For example, communications interface(s) 108 may include a configuration and monitoring interface for communicating with worker nodes 110-116. In another example, communications interface(s) 108 may include a user interface (UI), a graphical UI (GUI), and/or an application programming interface (API) for allowing user 118 or another entity to interact with master node 102.

User 118 may be any entity (e.g., an automated system or a device or system controlled or controllable by a human user) for selecting, viewing, and/or configuring various aspects associated with master node 102 or cluster 100. For example, user 118 may provide configuration information to master node 102 via communications interface(s) 108. Example UIs for interacting with master node 102 or cluster 100 may support automation (e.g., via one or more scripting languages), a representation state transfer (REST) API, a command line, and/or a web based GUI.

Each of worker nodes 110-116 may represent any suitable entity (e.g., one or more computing platforms or a device implemented using at least one processor) for performing various aspects associated with performing network testing and/or visibility related tasks or functions. For example, each of worker nodes 110-116 may include hardware (e.g., a network testing and/or visibility platform or a related device) from Keysight of Santa Clara, Calif. In this example, each of worker nodes 110-116 may execute an OS and/or other software provided by master node 102 or cluster controller 104, e.g., after being communicatively coupled to master node 102. Continuing with this example, the provided OS and/or other software may allow each of worker nodes 110-116 to act as a cluster appliance and/or provide cluster-based services and/or functions.

In some embodiments, an authentication process (e.g., a handshake process) between master node 102 and each of worker nodes 110-116 may be performed, e.g., when cabled to or otherwise connected to master node 102 and prior to being configured for cluster 100. In such embodiments, the handshake or authentication process be for confirming that worker nodes 110-116 are licensed or have approved hardware (e.g., worker nodes 110-116 are from an approved manufacturer or retailer) and meet version, functionality, and/or sanity requirements.

In some embodiments, a handshake or authentication process may be used to gather node related information for determining an appropriate configuration or boot image or related data from a repository of boot and/or configuration related data (e.g., stored in data storage 106). For example, e.g., during an initial authentication process, each of worker nodes 110-116 may provide master node 102 or cluster controller 104 with detailed information related to its constituent components (e.g., processing blade information, load module information, chassis information, software information, etc.). In this example authentication related messages and/or related node information may be exchanged, for example, via a proprietary protocol or other communications protocol.

In some embodiments, master node 102 may be configured to analyze node information provided by a worker node (e.g., worker node 116) and to create or access an appropriate configuration image for the worker node, where the appropriate configuration image (e.g., an OS image and/or additional data) can be downloaded to and/or deployed on the worker node.

In some embodiments, a configuration image may include software, configuration data, and/or other information for booting a worker node with a particular OS and related software such that the worker node is subsequently controlled by master node 102. In some embodiments, a configuration image may also include information for creating one or more pods and associated containerized applications that run within the pod(s). For example, a configuration image may include an OS image along with a cluster configuration agent that communicates with master node 102 or entities therein (e.g., cluster controller 104 or a Docker registry) to configure various aspects of a worker node for cluster related entities, functions, or services.

In some embodiments, master node 102 may provide configuration images (e.g., boot or OS images) to worker nodes 110-116 for various reasons, e.g., during an initial configuration of new hardware prior to or concurrently with being added cluster 100 or during a software or configuration update of a worker node that is already part of cluster 100. For example, in response to user 118 requesting upgrades or purchasing new features for worker node 110, master node 102 may select or create a configuration image for worker node 110 (which master node 102 already controls), where the configuration image includes an updated version of the OS running on worker node 110. In this example, the updated OS may provide new features, functions, and/or improve existing features and/or functions.

In some embodiments, worker nodes 110-116 may utilize a reboot-less or hot-boot architecture for deploying configuration images. In some embodiments, a reboot-less or hot-boot architecture may allow user 118 (e.g., via master node 102 or another entity) to make significant changes to a running system without requiring a full or hard reboot, thereby reducing the effective "downtime" of the system. For example, master node 102 or a related entity may provide an updated OS and/or kernel image to worker node 110 while worker node 110 is running a prior OS and/or kernel version. In this example, worker node 110 may be configured to receive and store the updated OS and/or kernel image from master node 102. Continuing with this example, worker node 110 may utilize a kexec system call or a similar command, which may allow worker node 110 to load the image (e.g., into random access memory (RAM)) and hot-boot directly into the updated OS and/or kernel from the currently running OS image and/or kernel.

In some embodiments, a reboot-less or hot-boot architecture may involve a launcher OS and a target OS, where the launcher OS hot-boots into the target OS and where the target OS can be received and stored while a worker node is running. For example, each of worker nodes 110-116 may store and utilize a launcher configuration image (e.g., a "pre-loaded" OS image) in a read-only memory partition. In such embodiments, while running, each of worker nodes 110-116 may be capable of receiving an updated configuration image from master node 102 or a related entity and storing the updated configuration image (e.g., in a read-only memory partition). After storing the updated configuration image, each of worker nodes 110-116 may be capable of hot-booting the updated configuration image using a read and write allowed memory partition (e.g., RAM or volatile memory).

In some embodiments, e.g., where a launcher OS is limited to just hot-booting into another OS, the related attack surface (and the need to completely update the launcher OS) is minimal. However, in some embodiments, the launcher OS may be updated as well, e.g., by deploying a binary image (e.g., via a file copy or dd command) to the read-only memory partition storing the launcher OS.

In some embodiments, a reboot-less or hot-boot architecture may provide various advantages over traditional OS deployment and management. For example, in lieu of apt-managed software updates used by some Linux based OSes, which have the potential to put the system into an indeterminate state, a reboot-less or hot-boot architecture allow worker nodes 110-116 to be updated with up-to-date OS functionality via configuration images. Moreover, since the configuration image or related OS may be a self-contained package, traditional (e.g., piece-meal) software and/or OS updates may be mitigated. Further, a reboot-less or hot-boot architecture can provide significant freedom and ease for OS changes to worker nodes 110-116 in the future, e.g., a switch from one Linux variant to another Linux variant, or from Linux to Windows, etc.

In some embodiments, user 118 may access master node 102 and view a comprehensive resource map associated with cluster 100 or related node(s) therein. For example, user 118 may reserve resources for various cluster related services or features. In this example, resource reservation information may be maintained by master node 102 and/or stored at data storage 106 and such information may be accessible or visible to some or all cluster-based entities and/or users.

In some embodiments, master node 102 or a related entity (e.g., cluster controller 104 or a scheduler) may include functionality for scheduling resource usage, e.g., compute, network, and data storage related resources. In such embodiments, master node 102 or a related entity may identify and manage or arbitrate resource contention among various users, nodes, or other entities. For example, assuming two users are attempting to setup different services that require a significant amount of compute resources and cluster 100 can only support one user's service, master node 102 or a related entity may notify these users and/or may prioritize (and setup) one service over another service based on one or more factors, e.g., user priority, service priority, predicted workload, current workload, and/or preferences set by a network operator or cluster operator (e.g., user 118).

It will be appreciated that FIG. 1 is for illustrative purposes and that various depicted entities, their locations, and/or their functions described above in relation to FIG. 1 may be changed, altered, added, or removed. It will also be appreciated that while intermediate nodes 106-108 are shown in FIG. 1, there could be more or less intermediate nodes.

Figure 2:
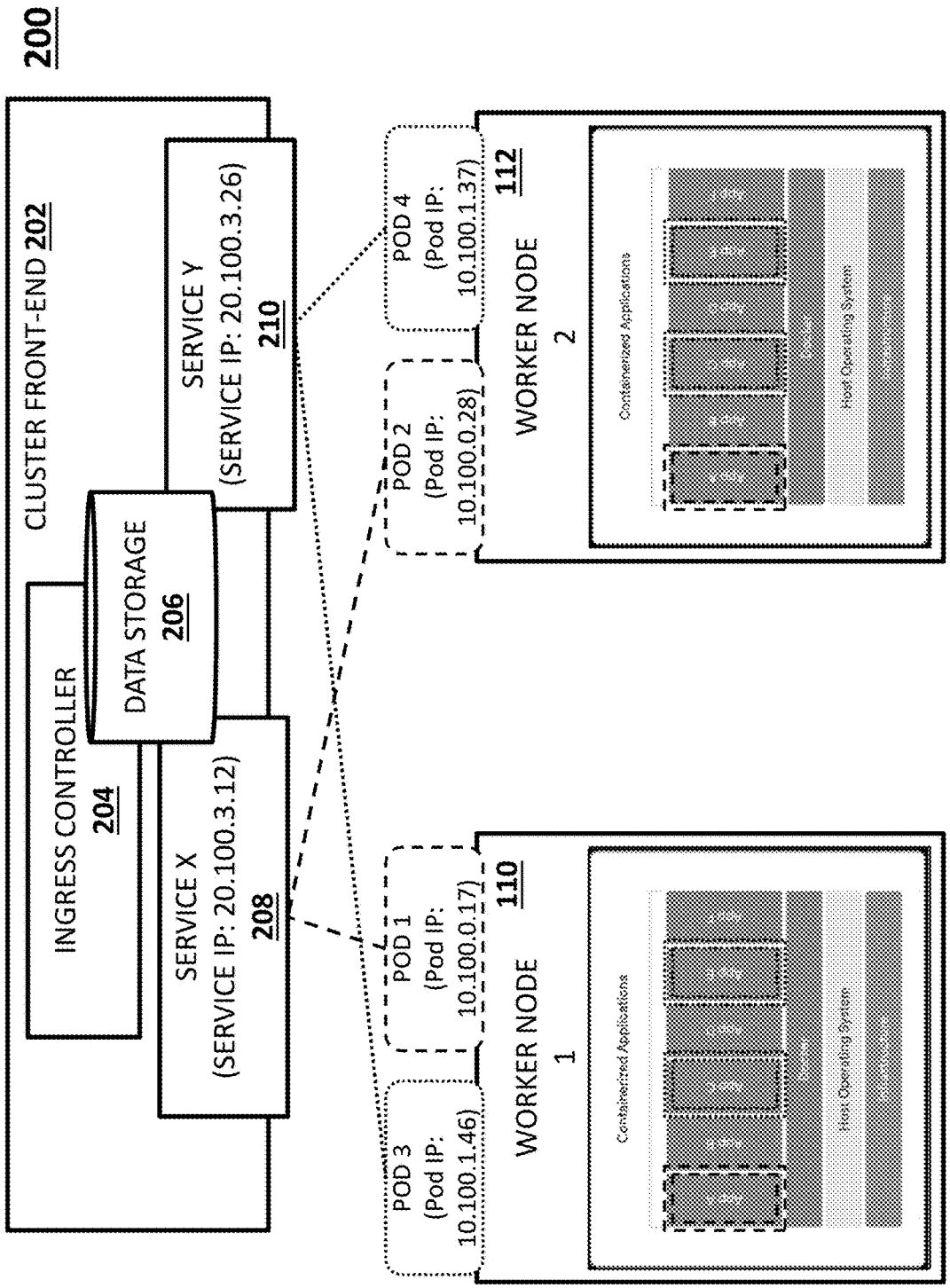
FIG. 2 is a block diagram illustrating an example cluster-based service environment.

FIG. 2 is a block diagram illustrating an example cluster-based service environment 200. Referring to FIG. 2, cluster-based service environment 200 may also include a service front-end (SFE) 202 for interacting with or communicating with cluster 100 or entities therein, e.g., worker nodes 110-112 and/or related pods and containers.

SFE 202 may represent any suitable entity or entities (e.g., software executing on at least one processor, a field-programmable gate array (FPGA), an application-specific integrated circuit (ASIC), or a combination of software, an ASIC, or an FPGA) for performing one or more aspects associated with receiving service requests and distributing (e.g., load sharing) these service requests to one or more containerized applications associated with one or more pods hosted on worker nodes 110-112.

In some embodiments, various features or functions associated with SFE 202 may be performed by an ingress controller 204. For example, ingress controller 204 may represent any suitable entity or entities (e.g., software executing on at least one processor) for receiving service requests from various sources (e.g., from the internet or another network), where the service requests are for requesting one or more network testing or network visibility related microservices. In this example, ingress controller 204 may distribute service requests to relevant pods based on an internet protocol (IP) data tuple (e.g., source IP, source port, destination IP, destination port, and protocol), a destination IP address (e.g., associated with a service), and/or other information.

Data storage 206 may represent any suitable entity (e.g., a computer readable medium, a database, a storage device, or memory) for storing various data associated with providing one or more cluster related and/or container related service, e.g., microservices. Example data stored in data storage 206 may include service requests, pod configuration data, network address information, cluster related information, load sharing algorithm, and/or other information. In some embodiments, data storage 206 may be used to store state or other information such that related service requests (e.g., requests from a same client) are sent to the same pod for handling.

In some embodiments, SFE 202 may be a separate node and/or entity from master node 102 and may be configured to access or communicate with cluster related resources, e.g., master node 102, worker nodes 110-112, containers, pods, etc. In some embodiments, SFE 202 may be master node 102 or include some similar functionality. For example, SFE 202 may be capable of configuring a new worker node 300 to be part of providing a service, e.g., a network testing or visibility microservice.

In some embodiments, each of worker nodes 110-112 may be a Kubernetes worker node with one or more pods comprising one or more containerized applications (e.g., Docker containers). For example, Kubernetes worker node may be controlled and administered via a Kubernetes master node. In this example, a Kubernetes master node and one or more Kubernetes worker nodes may be referred to as a Kubernetes cluster.

In some embodiments, each of worker nodes 110-112 may include a number of processes and/or software for cluster related communications and/or functions. For example, a Kubernetes worker node may include a Kubelet process usable for sending communications between the Kubernetes master node and the Kubernetes worker node. In this example, the Kubelet process may manage the pods and the containers running on the Kubernetes worker node.

In some embodiments, each of worker nodes 110-112 may include a container runtime (e.g., Docker, rkt) usable for obtaining a container image from a container registry (e.g., a Docker registry at master node 102), unpacking the container, and running the container or a related application. In some embodiments, each of worker nodes 110-112 may include a host operating system and related infrastructure usable for executing the container runtime, the containerized applications, and/or related software.

In FIG. 2, SFE 202 or ingress controller 204 may receive and distribute service requests for one or more different services, e.g., Service X and Service Y. For example, each service may represent an abstraction that includes a logical set of pods running somewhere in cluster 100, where the pods provide the same functionality. When created, each service may be assigned a unique IP address (also called clusterIP). For example, as depicted in FIG. 2, Service X may be associated with IP address '20.100.3.12' and Service Y may be associated with IP address '20.100.3.26'. A clusterIP address may be tied to its respective service for the service's lifespan and may not change while the service is active.

In some embodiments, SFE 202 or ingress controller 204 may load share or distribute communications sent to a clusterIP address via one or more pods associated with a related service. For example, as depicted in FIG. 2, Pods 1 and 2 may be associated with Service X and Pods 3 and 4 may be associated with Service Y. In this example, after selecting a particular pod to handle a service request, SFE 202 or ingress controller 204 may provide the service request to the appropriate pod by sending the service request to the pod using the pod's IP address. For example, Pod 1 may be associated with IP address '10.100.0.17' and Pod 2 may be associated with IP address '10.100.0.28', while Pod 3 may be associated with IP address '10.100.1.46' and Pod 4 may be associated with IP address '10.100.1.37'.

In some embodiments, each pod may be associated with a cluster-private IP address. Cluster-private IP addresses are generally unreachable by nodes outside the cluster (except via SFE 202), but can be used for inter-pod and inter-node communications. In some embodiments, pods associated with a particular service may also be associated with a same subnet or related subnet mask. By utilizing cluster-private IP addresses, containers within a given pod can reach each other's ports via localhost, and all pods in a cluster can see each other without NAT, thereby alleviating the need to explicitly create links between pods or to map container ports to host ports.

In contrast to using cluster-private IP address and pod related addressing as described above, some container based solutions may use host-private networking whereby containers can communicate with each other only if they are on the same host or node. For example, with a host-private networking, in order for Docker containers to communicate across nodes, there must be allocated ports on a Docker node's own IP address, which are then forwarded or proxied to the containers. In this example, containers must either coordinate which ports they use very carefully or ports must be allocated dynamically for such internode container communications to work. Since host-private networking requires port mappings to deliver internode communications, it can be very difficult to scale, particularly across developers, and can expose users to cluster-level issues outside of their control.

It will be appreciated that FIG. 2 is for illustrative purposes and that various depicted entities, their locations, and/or their functions described above in relation to FIG. 2 may be changed, altered, added, or removed.

Figure 3A:
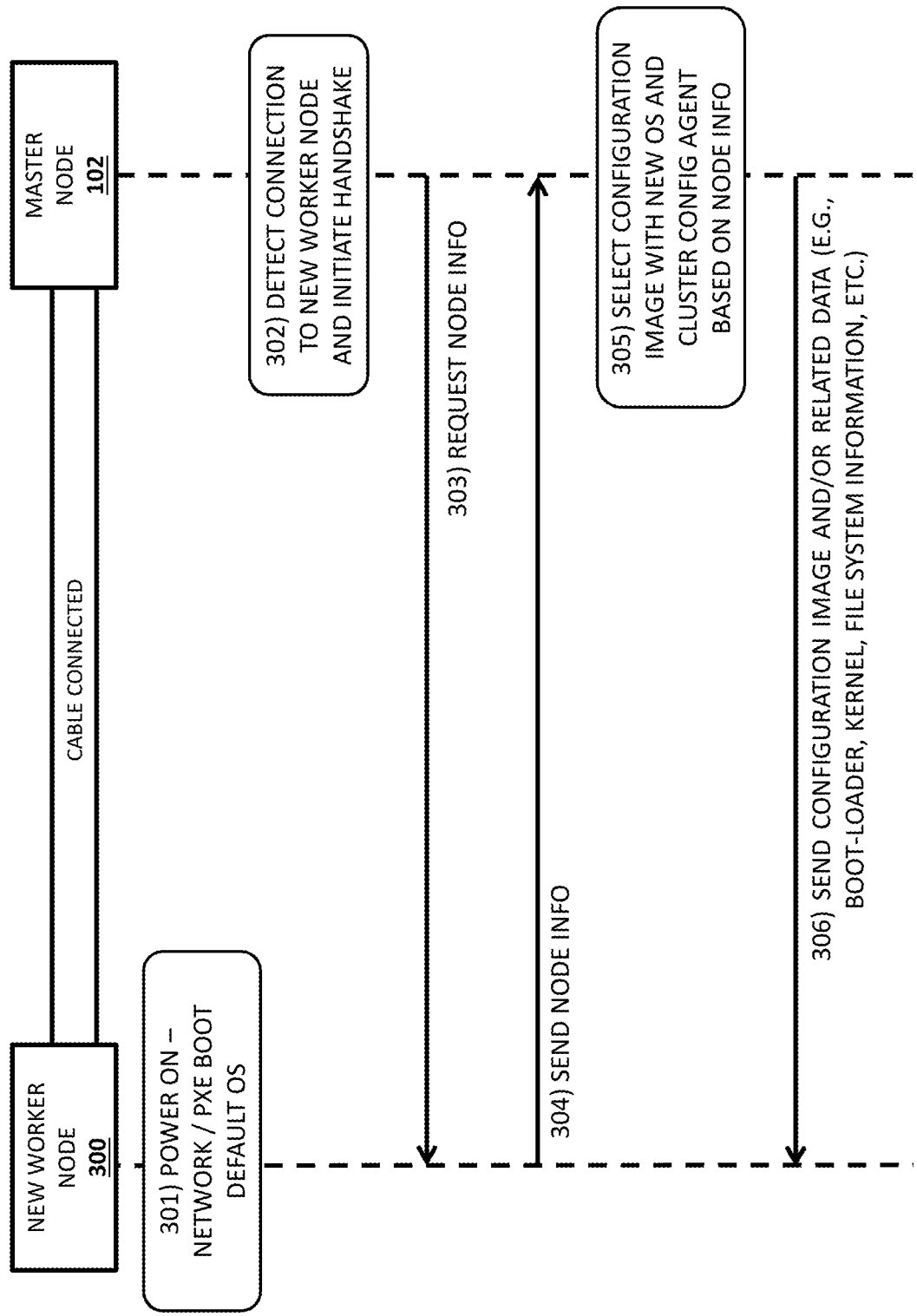

FIGS. 3A-3B depict a message flow diagram illustrating a worker node 300 joining cluster 100. In some embodiments, a customer (e.g., user 118) may purchase a new worker node 300 that includes hardware capable of being configured for cluster based applications. For example, worker node 300 may be a network testing or visibility platform from Keysight of Santa Clara, Calif. In this example, worker node 300 may include an OS preloaded by the manufacturer that may not include all features or capabilities of a newer available OS and/or may be incapable of connecting to cluster 100 without additional configuration (e.g., by master node 102). In some embodiments, to initiate or trigger a process for adding worker node 300 to cluster 100, worker node 300 may be communicatively coupled (e.g., connected via an Ethernet or network cable) to master node 102 in cluster 100.

Referring to FIG. 3A, in step 301, worker node 300 may power on and a network and/or preboot execution environment (PXE) may boot a default OS (e.g., a launcher or base OS initially loaded at time of manufacture).

In step 302, master node 102 may detect connection to worker node 300 and in response may initiate a handshake with worker node 300. For example, master node 102 may include or interact with a DHCP server. In this example, worker node 300 may send a DHCP discovery and a subsequent DHCP request message for requesting an IP address. In this example, in response to worker node 300 requesting an IP address, master node 102 may attempt to authenticate worker node 300 via a handshake and/or other mechanisms.

In some embodiments, a handshake or authentication process between master node 102 and worker node 300 may be for confirming that worker node 300 is authorized to receive an updated configuration image (e.g., an OS and kernel image) and/or to join cluster 100. For example, a handshake or authentication process between master node 102 and worker node 300 may confirm that worker node 300 is licensed or has approved hardware, that worker node 300 meets version, functionality, and/or sanity requirements. In some embodiments, a handshake or authentication process between master node 102 and worker node 300 may be used to gather node related information for determining an appropriate configuration image or related data from a repository of boot and/or configuration related data.

In step 303, e.g., as part of a handshake or authentication process, master node 102 may request node information (e.g., hardware component, system IDs and/or serial numbers, etc.) from worker node 300.

In step 304, worker node 300 may send node information about worker node 300 to master node 102.

In step 305, master node 102 may select or create a configuration image (e.g., an OS or kernel image) based on the node information from worker node 300. For example, master node 102 may use node information (e.g., hardware component information) from worker node 300 to create or access a configuration image for worker node 300. In this example, the configuration image may configure (e.g., using a provided cluster configuration agent) worker node 300 for joining cluster 100 and performing or helping perform one or more cluster-based services. In some embodiments, selecting or creating an configuration image may utilize a repository containing images and related data for various OSes, platforms, and/or architectures.

In step 306, master node 102 may send the configuration image and/or related data to worker node 300. For example, master node 102 may provide a configuration image comprising an OS image and a cluster configuration agent to worker node 300.

Referring to FIG. 3B, in step 307, worker node 300 may perform a hot-boot to effectively deploy or utilize the received configuration image and/or run a cluster configuration agent provided by master node 102. For example, cluster configuration agent may be software or code usable for joining cluster 100 and/or setting up cluster-based services. In this example, cluster configuration agent may request various cluster related data from master node 102 such that worker node 300 can set up and run pods and/or related containers for providing microservices or other functionality.

In step 308, worker node 300 may request cluster configuration information from master node 102. For example, worker node 300 may request information such that worker node 300 can join and communicate with cluster 100.

In step 309, master node 102 may send the cluster configuration information to worker node 300. For example, master node 102 may provide a number of container images, pod configuration data, and/or file system data, resource reservation data, and/or other information.

In step 310, worker node 300 may join cluster 100 using the cluster configuration information from master node 102. For example, after joining cluster 100 using the cluster configuration information from master node 102, worker node 300 may be configured as a cluster-based worker node and may subsequently administered and/or controlled via master node 102 (e.g., by user 118).

It will be appreciated that FIGS. 3A-3B are for illustrative purposes and that various depicted messages and details for configuring worker node 300 and/or adding worker node 300 to cluster 100 described above in relation to FIG. 2 may be changed, altered, added, or removed.

FIG. 4 is a diagram illustrating a memory partition schema 400 associated with a reboot-less or hot-boot based architecture. In some embodiments, worker nodes 110-116 may utilize a reboot-less or hot-boot architecture for deploying configuration images. In some embodiments, master node 102 may store a plurality of OSes in various memory partitions with different read and/or write permissions as represented by memory partition schema 400.

Referring to FIG. 4, memory partition schema 400 is depicted using a table representing associations between partition identifiers (IDs), descriptions, and read-write permissions. In some embodiments, memory partition schema 400 may indicate how master node 102 stores configuration images (e.g., OS images) for worker nodes 110-116, e.g., in persistent memory. In some embodiments, memory partition schema 400 may indicate which memory partition a worker node store a given OS image and access permissions associated with those memory partitions.

A first OS image depicted in memory partition schema 400 may represent a factory restore OS image and may be stored in a read-only memory partition (e.g., so that the factory restore OS image cannot be inadvertently modified). For example, a factory restore OS may be the original OS of master node 102. In another example, a factory restore OS may be the original OS of worker node 300 (e.g., prior to receiving a configuration image from master node 102). In this example, the factory restore OS may also act as a launcher OS and may be capable of allowing worker node 110 to receive a configuration image while worker node 110 is running and to hot-boot this configuration image or a related OS.

A second OS image depicted in memory partition schema 400 may represent a current base OS (e.g., a target OS) and may be stored in a read-only memory partition (e.g., so that the base OS image cannot be inadvertently modified). For example, a base OS image may represent a current (e.g., actively running) OS of master node 102. In another example, a base OS image may be an up-to-date OS for worker node 300 and may be provided to worker node 300 by master node 102. In this example, while the base OS image may be stored in a read-only memory partition, worker node 300 may load the base OS image into RAM and hot-boot into the base OS, where the hot-booted OS in RAM may be modifiable.

User data depicted in memory partition schema 400 may represent various data that can be modified and may be stored in a read and write allowed memory partition. For example, user data may represent current state information related to cluster related operations stored in write allowed memory in master node 102. In another example, user data may include a hot-booted OS of worker node 300 loaded in RAM and, while running, worker node 300 may modify or change the hot-booted OS. In this example, if worker node 300 is powered off, the OS and related data stored in RAM is lost. Continuing with this example, when powered back on, worker node 300 may load the unmodified base OS image (from a read-only memory partition) back into RAM and hot-boot into the base OS.

It will be appreciated that memory partition schema 400 in FIG. 4 is for illustrative purposes and that different and/or additional information may also be stored or maintained.

Figure 5:
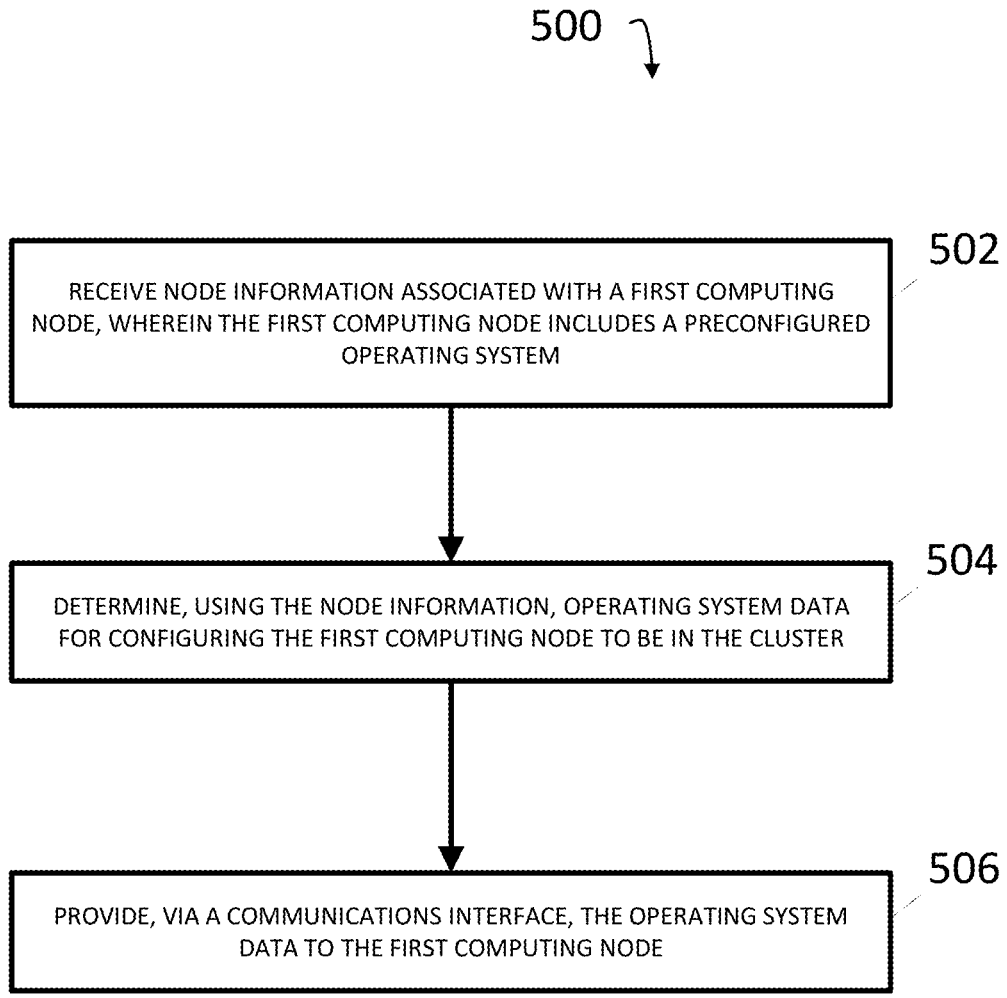
FIG. 5 is a flow chart illustrating an example process for self-replicating cluster appliances.

FIG. 5 is a diagram illustrating an example process 500 for self-replicating cluster appliances. In some embodiments, process 500, or portions thereof, may be performed by or at master node 102, cluster controller 104, worker node 300, and/or another node or module. In some embodiments, process 500 may include steps 502, 504, and/or 506.

Referring to process 500, in step 502, node information associated with a first computing node may be received, wherein the first computing node may include a preconfigured OS. In some embodiments, node information may include processing blade information, load module information, chassis information, and/or loaded software information.

In step 504, OS data for configuring the first computing node to be in the cluster may be determining using the node information. In some embodiments, OS data may include an OS image, a cluster configuration agent, a container OS, a kernel, or a filesystem.

In step 506, the OS data may be provided, via a communications interface, to the first computing node. For example, the OS data may be provided from master node 102 via a file transfer protocol (FTP) or a trivial FTP (TFTP).

In some embodiments, process 500 may include actions (e.g., steps 502-506) performed by a controller node (e.g., master node 102) and may include additional actions performed by or a first computing node (e.g., worker node 300). For example, a first computing node may be configured for receiving OS data (e.g., an OS image and a cluster configuration agent) from a controller node; and for using the OS data to configure the first computing node to be in the cluster and to provide at least one network testing or visibility service.

In some embodiments, using OS data to configure a first computing node may include rebooting the first computing node in response to receiving a reboot command from the controller node via an IPMI. For example, a baseboard management controller (BMC) in worker node 300 may communicate with a bootstrap supervisor agent in master node 102 and may receive a command (e.g., 'ipmitool chassis bootdev pxe') for changing the boot order of worker node 300 and may receive a reboot command (e.g., 'ipmitool chassis power reset') for trigger worker node 300 to reboot and use the new boot order.

In some embodiments, a network testing or visibility service associated with cluster 100 may use at least one pod in the cluster, wherein the at least one pod may include one or more containers. In some embodiments, the at least one pod or containers therein may execute on the first computing node or another node in the cluster, wherein service requests may be load balanced using the at least one pod.

In some embodiments, receiving node information may be associated with an authentication process for determining that a first computing node is authorized to receive OS data. For example, master node 102 may perform a handshake with worker node 300 to determine that worker node 300 is authorized equipment for receiving a new OS image which would allow worker node 300 to join a cluster. In this example, to determine that worker node 300 is authorized, worker node 300 may send node information about itself to master node 102.

In some embodiments, a controller node (e.g., master node 102) may be a Kubernetes master node and a first computing node may be a Kubernetes worker node (e.g., worker node 300).

In some embodiments, a first computing node may store a first OS (e.g., a base or launcher OS) in a read-only memory, wherein the first OS may unpack a second OS (e.g., from an OS image provided by master node 102) in a read and write allowed memory (e.g., RAM) and may load the second OS capable of providing at least one network testing or visibility service.

In some embodiments, a controller node may support resource reservations or resource contention arbitration associated with a cluster.

It will be appreciated that process 500 is for illustrative purposes and that different and/or additional actions may be used. It will also be appreciated that various actions described herein may occur in a different order or sequence.

It should be noted that master node 102, cluster controller 104, worker node 300, and/or functionality described herein may constitute a special purpose computing device. Further, master node 102, cluster controller 104, worker node 300, and/or functionality described herein can improve the technological field of node and cluster configuration for various cluster related applications or microservices, e.g., network testing and/or visibility services. For example, master node 102 or cluster controller 104 can be configured to self-replicate cluster appliances by configuring a new node to act a cluster appliance (e.g., worker node 300). In this example, master node 102 or cluster controller 104 can authenticate a new node, select appropriate OS data (e.g., an OS image and a cluster configuration agent) for the new node based on the node's capabilities (e.g., a node's hardware and software resources), and provide the OS data to the new node such that the new node can be added to the cluster and that the new node can provide or help provide a microservice, e.g., at least one network testing or visibility service. Also, master node 102 or cluster controller 104 may improve the technological field of cluster management and related services by providing resource reservations and resource contention arbitration for nodes within a cluster. Also, worker node 300 and/or functionality described herein can improve the technological field of OS and/or node configuration by storing a launcher or base OS/kernel in a read-only memory partition and a newer OS/kernel (e.g., from master node 102) in a read-write memory partition, where the launcher OS/kernel hot-boots the newer OS/kernel. For example, a launcher OS/kernel can be configured to unpack and load a newer OS/kernel into RAM (e.g., overwriting any previous in-memory OS/kernel instance) and to utilize the newer kernel/OS instance.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for self-replicating cluster appliances, the method comprising:
   at a controller node configured for controlling a cluster of one or more network testing and/or visibility nodes:
   receiving, during an authentication process, node information associated with a first computing node that is not a member of the cluster, wherein the first computing node includes a preconfigured operating system, wherein the authentication process is initiated after the first computing node is connected to the controller node via a physical cable and after the first computing node sends a dynamic host configuration protocol (DHCP) request message for requesting an IP address;
   determining, using the node information, an operating system image for configuring the first computing node to be a member of the cluster; and
   providing, via a communications interface, the operating system image to the first computing node; and
   at the first computing node:
   receiving the operating system image; and
   performing, using the operating system image, a hot-boot to configure the first computing node to be a member of the cluster as a worker node controllable by the controller node and to provide at least one network testing or visibility service via at least one pod in the cluster.

2. The method of claim 1 wherein using operating system image to configure the first computing node includes rebooting the first computing node in response to receiving a reboot command from the controller node via an intelligent platform management interface.

3. The method of claim 1 wherein the at least one pod includes one or more containers.

4. The method of claim 1 wherein the authentication process is associated with determining that the first computing node is authorized to receive the operating system image.

5. The method of claim 1 wherein the node information includes processing blade information, load module information, chassis information, and/or loaded software information.

6. The method of claim 1 wherein the operating system image includes a cluster configuration agent, a container operating system, a kernel, or a filesystem.

7. The method of claim 1 wherein the controller node is a Kubernetes master node and the first computing node is a Kubernetes worker node.

8. The method of claim 1 wherein the first computing node stores a first operating system in a read-only memory, wherein the first operating system unpacks a second operating system in a read and write allowed memory and loads the second operating system capable of providing the at least one network testing or visibility service.

9. The method of claim 1 wherein the controller node supports resource reservations or resource contention arbitration associated with the cluster.

10. A system for self-replicating cluster appliances, the system comprising:
   at least one processor;
   a memory;
   a controller node implemented using the at least one processor and the memory, wherein the controller node is configured for controlling a cluster of one or more network testing and/or visibility nodes, wherein the controller node is further configured for:
      receiving, during an authentication process, node information associated with a first computing node that is not a member of the cluster, wherein the first computing node includes a preconfigured operating system, wherein the authentication process is initiated after the first computing node is connected to the controller node via a physical cable and after the first computing node sends a dynamic host configuration protocol (DHCP) request message for requesting an IP address;
      determining, using the node information, an operating system image for configuring the first computing node to be a member of the cluster; and
      providing, via a communications interface, the operating system image to the first computing node; and
   the first computing node, wherein the first computing node is configured for:
      receiving the operating system image; and
      performing, using the operating system image, a hot-boot to configure the first computing node to be a member of the cluster as a worker node controllable by the controller node and to provide at least one network testing or visibility service via at least one pod in the cluster.

11. The system of claim 10 wherein using operating system image to configure the first computing node includes rebooting the first computing node in response to receiving a reboot command from the controller node via an intelligent platform management interface.

12. The system of claim 10 wherein the at least one pod includes one or more containers.

13. The system of claim 10 wherein the controller node is communicatively coupled to the first computing node.

14. The system of claim 10 wherein the authentication process is associated with determining that the first computing node is authorized to receive the operating system image.

15. The system of claim 10 wherein the node information includes processing blade information, load module information, chassis information, and/or loaded software information.

16. The system of claim 10 wherein the operating system image includes a cluster configuration agent, a container operating system, a kernel, or a filesystem.

17. The system of claim 10 wherein the controller node is a Kubernetes master node and the first computing node is a Kubernetes worker node.

18. The system of claim 10 wherein the first computing node stores a first operating system in a read-only memory, wherein the first operating system unpacks a second operating system in a read and write allowed memory and loads the second operating system capable of providing the at least one network testing or visibility service.

19. The system of claim 10 wherein the controller node supports resource reservations or resource contention arbitration associated with the cluster.

20. A non-transitory computer readable medium having stored thereon executable instructions that when executed by at least one processor of at least one computer cause the at least one computer to perform steps comprising:
   at a controller node configured for controlling a cluster of one or more network testing and/or visibility nodes:
      receiving, during an authentication process, node information associated with a first computing node that is not a member of the cluster, wherein the first computing node includes a preconfigured operating system, wherein the authentication process is initiated after the first computing node is connected to the controller node via a physical cable and after the first computing node sends a dynamic host configuration protocol (DHCP) request message for requesting an IP address;
      determining, using the node information, an operating system image for configuring the first computing node to be a member of the cluster; and
      providing, via a communications interface, the operating system image to the first computing node; and
   at the first computing node:
      receiving the operating system image; and
      performing, using the operating system image, a hot-boot to configure the first computing node to be a member of the cluster as a worker node controllable by the controller node and to provide at least one network testing or visibility service via at least one pod in the cluster.

* * * * *